(12) United States Patent
Dollmann et al.

(10) Patent No.: US 7,041,962 B2
(45) Date of Patent: May 9, 2006

(54) LASER SCANNING APPARATUS

(75) Inventors: Thomas Dollmann, Winden (DE); Stefan Mack, Freiburg (DE)

(73) Assignee: Sick AG, Waldkirch/Breisgau (DE)

( * ) Notice: Subject to any disclaimer, the term of this patent is extended or adjusted under 35 U.S.C. 154(b) by 204 days.

(21) Appl. No.: 10/612,883

(22) Filed: Jul. 3, 2003

(65) Prior Publication Data
US 2005/0006573 A1 Jan. 13, 2005

(30) Foreign Application Priority Data
Jul. 5, 2002 (DE) ................. 102 30 397

(51) Int. Cl.
*H01J 3/14* (2006.01)
*H01J 40/14* (2006.01)
*H01J 5/16* (2006.01)

(52) U.S. Cl. ............... 250/234; 250/236; 356/239.1

(58) Field of Classification Search ........ 250/234–236, 250/559.48, 559.49; 356/239.1, 239.8; 318/483, 318/DIG. 2; 15/250.12
See application file for complete search history.

(56) References Cited
U.S. PATENT DOCUMENTS
6,153,878 A * 11/2000 Jakob et al. ............. 250/216

FOREIGN PATENT DOCUMENTS

| DE | 19652441 A1 | 6/1998 |
| DE | 4340756 C2 | 7/1998 |
| DE | 19709906 A1 | 9/1998 |
| DE | 19732776 C1 | 2/1999 |
| DE | 19735037 A1 | 2/1999 |
| DE | 19800968 A1 | 7/1999 |
| DE | 10025511 C1 | 12/2001 |
| DE | 10041182 A1 | 3/2002 |

* cited by examiner

*Primary Examiner*—David Porta
*Assistant Examiner*—Suezu Ellis
(74) *Attorney, Agent, or Firm*—Townsend and Townsend and Crew LLP

(57) ABSTRACT

The invention relates to a laser scanning apparatus, in particular for distance determination, comprising a transmission unit which has a pulsed laser for the transmission of a light beam into a zone to be monitored, comprising a light deflection unit to deflect the light beam transmitted by the pulsed laser into the zone to be monitored, comprising a reception unit for the reception of light pulses which are reflected by an object located in the zone to be monitored, and comprising a front screen which transmits the light beam and which separates the transmission unit, the reception unit and the light deflection unit from the surroundings of the laser scanning apparatus, with at least one optical element being provided which splits off a part beam from the transmitted light beam and deflects the part beam to a photo-detector for a measurement of the transmission of the front screen.

45 Claims, 2 Drawing Sheets

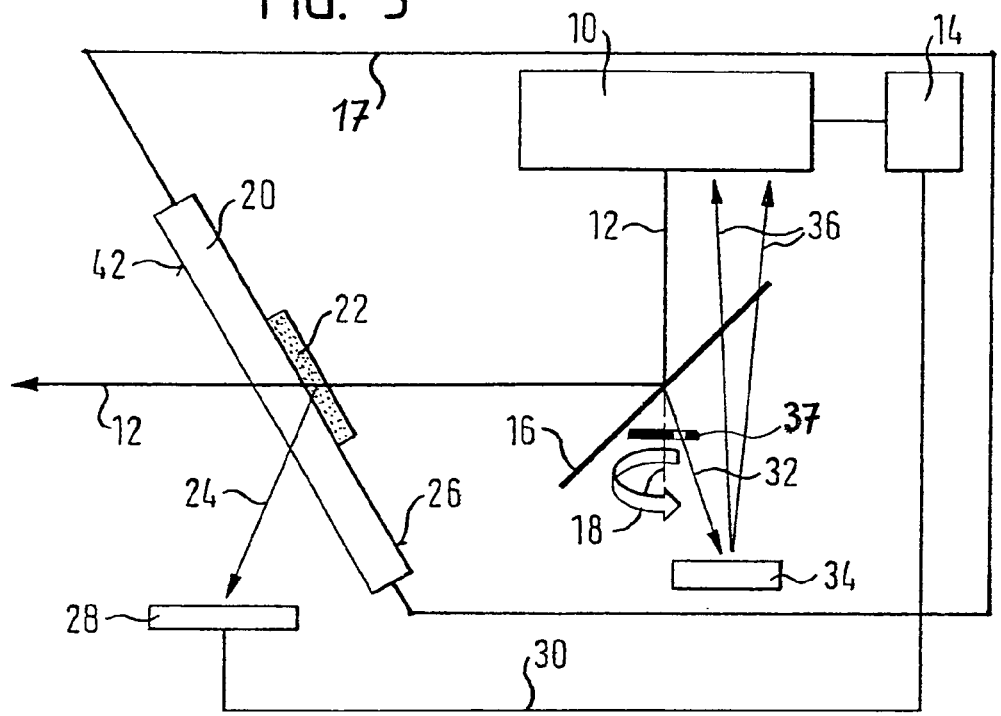
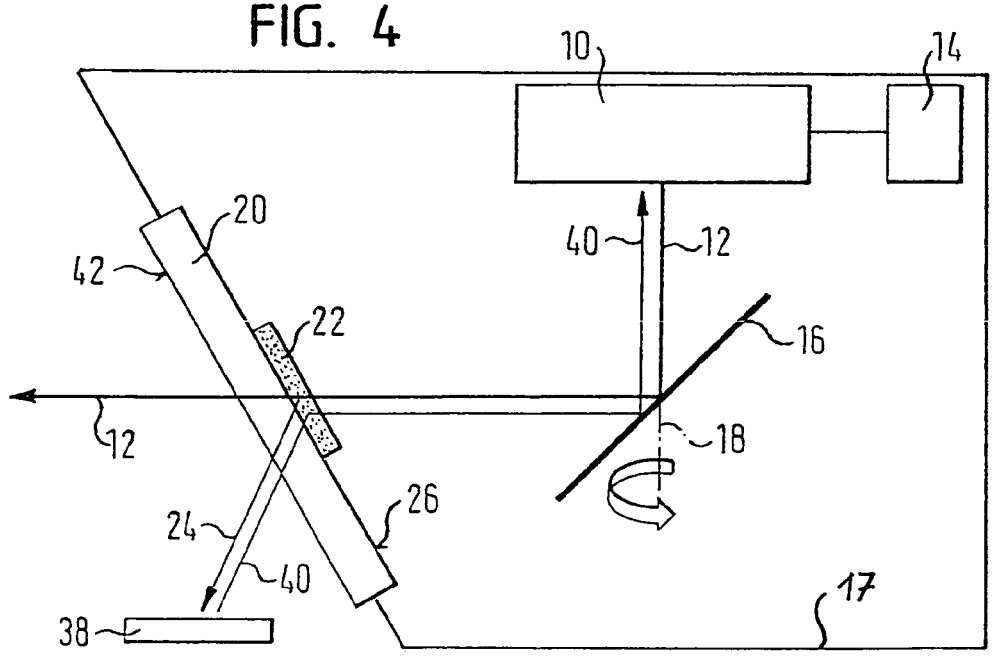

LASER SCANNING APPARATUS

BACKGROUND OF THE INVENTION

The invention relates to a laser scanning apparatus, in particular for distance determination, having a transmitter unit which has a pulsed laser for the transmission of a light beam into a zone to be monitored, having a light deflection unit to deflect the light beam transmitted by the pulsed laser into the zone to be monitored, having a reception unit for the reception of light pulses which are reflected by an object located in the zone to be monitored and having a front screen which transmits the light beam and which separates the transmission unit, the reception unit and the light deflection unit from the surroundings of the laser scanning apparatus.

Such laser scanning apparatuses are generally known. They are used, for example, for distance determination in motor vehicles. The time between the transmission of a light pulse and the reception of the correspondingly reflected light pulse is measured and the distance between the laser scanning apparatus, i.e. the motor vehicle, and the object at which the light pulse was reflected is determined from the light speed and the run time of the received light pulse. In addition, such laser scanning apparatuses can be provided with a light deflection arrangement, for example a rotating light deflection arrangement to change the direction in which the light pulses are radiated within predetermined angular ranges. In this way, the surroundings of the laser scanning apparatus can be scanned within the predetermined ranges. The relative position of the object with respect to the laser scanning device can consequently be determined from the direction in which the light pulse was radiated and from the distance.

To ensure a reliable operation of the laser scanning apparatus, the light transmission, and thus the degree of contamination, of the front screen is monitored to ensure a uniform transmission and thus a correct range. For this purpose, a plurality of light sources, typically light-emitting diodes, and corresponding light detectors are usually arranged such that the light transmitted from the light sources passes through the front screen at least once on the way to the respective light detector. Deposits on the front screen which degrade or change the transmission of the front screen can be determined with reference to the intensity of the light detected by the light detector.

Moreover, the function of the transmission and reception unit is checked at regular time intervals. In laser scanning apparatuses which monitor an angular range of less than 360°, the light beam transmitted by the transmission unit is deflected for this purpose onto a reference target which is disposed on a side of the deflection device remote from the front screen, i.e. in a blind angular range, and reflects the light beam back onto the reception unit.

On a contamination of the front screen or on a disturbance in the transmission unit and/or the reception unit, a warning signal can be triggered.

SUMMARY OF THE INVENTION

It is an underlying object of the invention to provide a laser scanning apparatus for an angular range to be monitored of 360° with increased reliability and security with a simplified construction.

The laser scanning apparatus in accordance with the invention includes a transmission unit which has a pulsed laser for the transmission of a light beam into a zone to be monitored, a light deflection unit to deflect the light beam transmitted by the pulsed laser into the zone to be monitored, a reception unit to receive light pulses which are reflected from an object located in the zone to be monitored and a front screen which transmits the light beam and which separates the transmission unit, the reception unit and the light deflection unit from the surroundings of the laser scanning apparatus. In accordance with the invention, at least one optical element is provided which splits a part beam from the transmitted light beam and deflects the light beam to a photo-detector for a measurement of the transmission of the front screen.

Since, in accordance with the invention, a part beam is split off from the transmitted light beam and is deflected through the front screen, one and the same light source, namely the pulsed laser of the transmission unit, is used simultaneously for the distance measurement and for the measurement of the transmission of the front screen. The pulsed laser of the transmission unit therefore satisfies two functions at the same time. In accordance with the invention, the large number of additional light sources required for a full-area monitoring of the front screen transmission and the electrical connection of the light sources associated therewith can be dispensed with so that a simplified construction of the laser scanning apparatus in accordance with the invention is achieved.

Additionally or alternatively, the split-off part beam can also be used for a reference target measurement, i.e. for the checking of the function of the transmission unit and of the reception unit. With the additional reference target measurement, the pulsed laser satisfies a total of three functions in addition to the distance measurement and the measurement of the front screen transmission, whereby the construction of the laser scanning apparatus in accordance with the invention is simplified even further.

The optical element can thus be coupled to the front screen in accordance with an advantageous embodiment of the laser scanning apparatus. The split-off part beam is thereby coupled into the front screen in a particularly effective manner such that an unwanted reflection of the part beam at the front screen can largely be precluded.

The optical element can be a separate component fastened to the front screen, in particular to its inner side. In this case, it can also be attached to the front screen after the front screen has already been installed. When the optical component is attached to the inner side of the front screen, it is moreover protected against external influences and in particular against contamination.

The optical element is preferably integrated into the front screen. The optical element can thus be formed simultaneously together with the front screen, whereby the manufacture of the laser scanning apparatus is simplified.

At least one photo-detector for the measurement of the intensity of the received part beam is advantageously disposed on the side of the front screen remote from the transmission unit, the reception unit and the light deflection unit. It is ensured in this manner that the part beam passes through the front screen at least once, which allows a determination of the front screen transmission.

The at least one photo-detector for the measurement of the intensity of the received part beam and the light deflection unit can also be disposed on the same side of the front screen, with the front screen being made such that the part beam passes through the front screen at least twice. In this case, the photo-detector is also protected against external influences, and in particular against contamination, by the front screen.

The photo-detector is preferably disposed above or underneath the front screen. This prevents an impairment of the propagation of the transmitted light beam and thus of the distance determination.

In accordance with a particularly preferred embodiment of the laser scanning apparatus in accordance with the invention, at least one reflector element is disposed on the side of the front screen remote from the transmission unit, the reception unit and the light deflection unit, and at least part of the part beam can be reflected by said reflector element via the optical element and via the light deflection unit into the reception unit. The reflector element allows the checking of the function of the transmission unit or of the reception unit (reference target measurement), on the one hand, and the determination of the front screen transmission, on the other hand, in that it reflects the split-off part beam through the front screen back onto the reception unit. It can then be ascertained, on the one hand, in the reception unit or in a corresponding evaluation unit whether a light beam was transmitted at all or whether a part beam was split off and/or received by the reception unit. On the other hand, the intensity of the part beam reflected by the reflector element can simultaneously be determined, with the part beam having passed through the front screen at least twice and its intensity being doubly weakened with a corresponding contamination of the front screen so that even slight changes in the transmission of the front screen can be reliably detected.

In this case, the pulsed laser of the transmission unit therefore satisfies three functions at the same time: first, it transmits a light beam for the distance measurement; second, a part beam is split off and deflected onto a reflector element for the checking of the function of the transmission unit and of the reception unit; and third, the split-off part beam is used for the determination of the front screen transmission.

On the use of the part beam reflected at the reflector element for the determination of the front screen transmission and for the detection or evaluation of the reflected part beam in the reception unit, additional separate light detectors can be omitted, which would have to be provided in a comparatively large number along the front screen in order to be able to monitor its transmission over the whole area. An additional arrangement for the reference target measurement and additional light sources can consequently be omitted. The construction of the laser scanning apparatus in accordance with the invention is thereby further simplified.

The reflector element and the light deflection unit can also be disposed on the same side of the front screen, with the front screen being designed such that the part beam passes through the front screen at least twice. In this case, the reflector element is also protected against external influences, and in particular against contamination, by the front screen.

It is particularly advantageous for the reflector element to be disposed above or beneath the front screen. In this manner, an impairment of the propagation of the light beam transmitted for the distance determination is prevented.

In accordance with a further embodiment of the invention, the light deflection unit is designed such that a reference beam can be split off from the transmitted light beam and can be deflected in the direction of a reference beam. In particular when a 360° monitoring is provided by the laser scanning apparatus, the reference target can be suitably positioned, for example underneath the light deflection unit in order not to impair the propagation of the light beam transmitted for the distance measurement. The flexibility in the arrangement of the reference target is increased in that the reference beam can be deflected in the direction of the reference target by the light deflection unit.

The reference target is preferably made in a reflecting manner and the light deflection unit is preferably made to transmit light such that the reference beam can be coupled into the reception unit via the light deflection unit after reflection at a reflection target. The flexibility in the arrangement of the reference target relative to the reception unit is thereby further increased.

The reference beam can advantageously be controlled by an operative switching arrangement such that it is only incident on the reference target in predetermined angular positions of the light deflection unit. The data volumes occurring on the reference target measurement can thereby be reduced.

In accordance with a further particularly preferred embodiment of the laser scanning apparatus in accordance with the invention, the light deflection unit can be rotated about an axis, in particular a vertical axis, in order to monitor an angular range of 360° with the transmitted light beam, in particular in a horizontal plane. The rotation of the light deflection unit about the vertical axis represents a possibility of achieving a 360° monitoring which is particularly easy to realize from a construction aspect. The transmission unit and the reception unit do not need to be made movable so that the number of the moving components is reduced.

The reference beam can be controllable by an operative switching arrangement such that it is only incident on the reference target in predetermined angular positions of the light deflection unit. In this manner, the number of measurement points for the checking of the function of the transmission unit and of the reception unit, i.e. the incurred data volume, can be reduced.

A further subject of the invention is moreover a method for the monitoring of a front screen of a laser scanning apparatus, in particular in accordance with any one of the previously recited types, in which a part beam is split off from a light beam transmitted by a transmission unit, in particular a transmission unit comprising a pulsed laser, by an optical element, in particular by an optical element coupled with a front screen, and is deflected through the front screen in order to determine the front screen transmission. The advantages of the laser scanning apparatus in accordance with the invention recited in the above can be particularly easily implemented by the method in accordance with the invention.

The present invention will be described purely by way of example in the following with reference to advantageous embodiments and to the enclosed drawings.

BRIEF DESCRIPTION OF THE DRAWINGS

FIG. 3 shows a laser scanning apparatus in accordance with the invention in accordance with a second embodiment in which a reference target is provided beneath a light deflection unit; and FIG. 4 shows a third embodiment of the laser scanning apparatus in accordance with the invention in which a part beam reflected at a reflector element is used both for the determination of the front screen transmission and for a reference target measurement.

DESCRIPTION OF THE PREFERRED EMBODIMENTS

Figure 1:
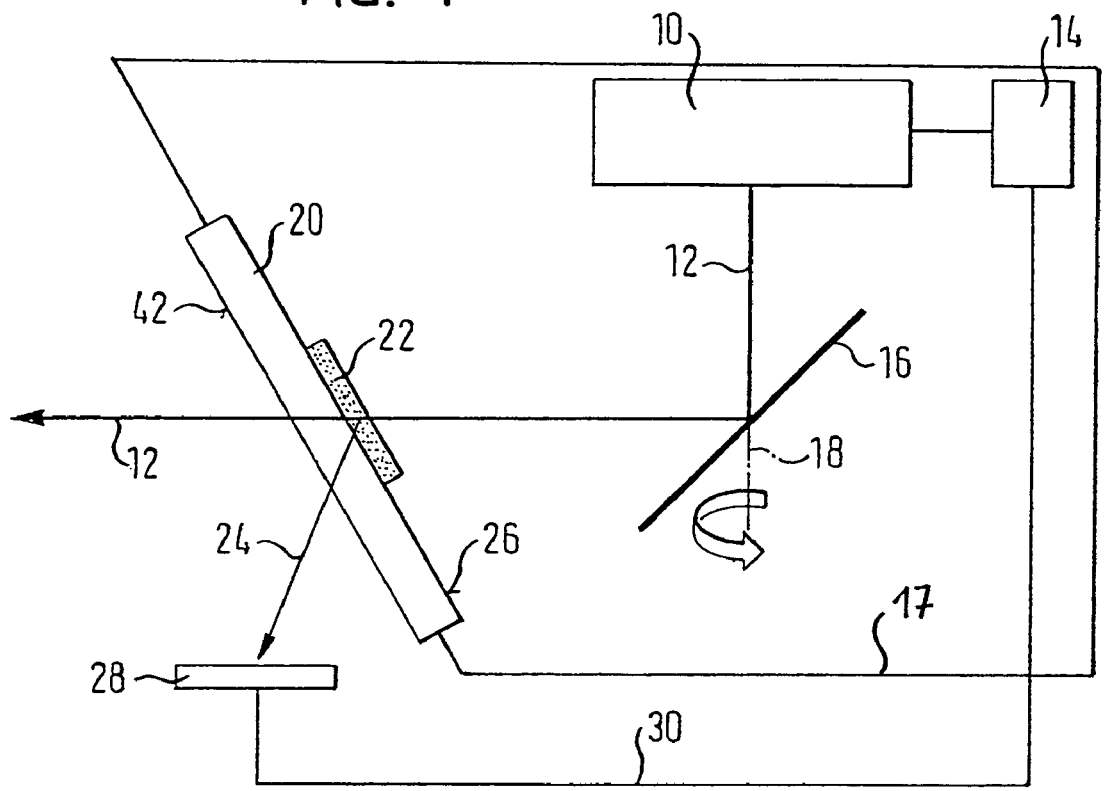
FIG. 1 shows a laser scanning apparatus in accordance with the invention in accordance with a first embodiment in which an optical element is attached to a front screen.

In FIG. 1, a first embodiment of the laser scanning apparatus in accordance with the invention is shown schematically. The laser scanning apparatus has a combined transmission/reception unit 10 (transceiver unit 10) which includes a pulsed laser for the radiation of a pulsed laser light beam, for example in the infrared wavelength range, and a photo-detector correspondingly adapted to the laser light for the reception of a laser light pulse reflected, where applicable, at an object located in the zone to be monitored. Although the pulsed laser and the photo-detector in the embodiment shown are combined in one unit 10, it is generally also possible to provide these in a transmission unit and a reception unit separate from one another.

The principle of the distance measurement functions as follows: The pulsed laser transmits a pulsed light beam or a light pulse 12 which exits the laser scanning apparatus on a path which will be described further below. If the light beam 12 is incident on an object located in the space to be monitored, it is reflected at this and is detected by the photo-detector of the transceiver unit 10. The distance of the object at which the light pulse was reflected is determined in an evaluation unit 14 while taking into account the light speed from the run time of the received light pulse.

The evaluation unit 14 is shown in FIG. 1 as a unit separate from the transceiver unit 10. It is, however, equally easily possible to integrate the evaluation unit 14 in the transceiver unit 10 (the same also applies to the embodiments shown in FIG. 3 and FIG. 4).

The light beam 12 is transmitted in a substantially vertical direction by the pulsed laser of the transceiver unit and is incident on a light deflection unit 16 by which the light beam 12 is deflected approximately at right angles in a substantially horizontal direction. In the embodiment shown in FIG. 1, the deflection unit 16 is formed by a planar mirror which does not transmit the laser light. The light deflection unit 16 is rotatably mounted about a vertical axis 18 and is rotated with the aid of a drive motor (not shown), with the revolution speeds being able to lie in the range of some thousand to several thousand revolutions per minute. It is achieved by the rotation of the deflection unit 16 that the light beam 12 transmitted by the pulsed laser sweeps over an angular range of 360° in a plane perpendicular to the rotation axis 18, i.e. in a substantially horizontal plane.

It is also possible that the light beam 12 is deflected by the light deflection unit 16 at a different angle to a right angle such that the light beam 12 describes a conical jacket surface on a rotation about the axis 18 or such that the rotational axis 18 is not vertically oriented, but is tilted relevant to the vertical orientation.

To protect the transceiver unit 10, the evaluation unit 14, the deflection unit 16 and other components (not shown) of the laser scanning apparatus against external influences, they are accommodated in a housing 17. So that the light beam 12 transmitted by the pulsed laser can emerge from the laser scanning apparatus, the housing has a front screen 20 which is formed from a material which transmits the laser light, for example glass. To allow a 360° monitoring, the front screen 20 is made in ring shape; i.e. it surrounds the light deflection unit 16 at least in the region of the plane in which the light beam 12 deflected by the deflection unit 16 rotates. So that the light beam 12 can pass through the front screen 20 at any angular position, the plane formed by the rotating light beam 12 intersects the front screen 20 approximately in a central region.

In the region of the front screen 20 in which the light beam 12 passes through the front screen 20, an optical element 22 is provided to split off a part beam 24, i.e. a low intensity portion and/or cross-sectional portion, from the light beam 12 emerging from the laser scanning apparatus. As is shown in FIG. 1, the optical element 22 is arranged at an inner side 26 of the front screen 20, i.e. at the side of the front screen 20 facing the deflection unit 16. The optical element 22 preferably has a diffractive effect and is preferably made as an optical grid. It can, for example, be made from a suitably structured foil which is adhered to the inner side 26 of the front screen 20.

Figure 2:
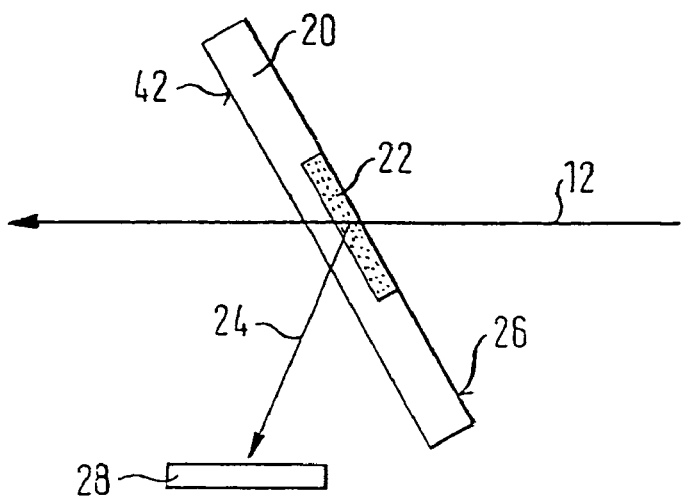
FIG. 2 shows an optical element that is integrated into the front screen.

As is shown in FIG. 2, the optical element 22 can also be directly integrated into the front screen 20. For example, a suitable grid structure can also be introduced into the front screen 20 on the manufacture of the front screen 20, e.g. by stamping, lasering, sawing or etching.

As is shown in FIG. 1, the part beam 24 passes through the front screen 20 and is incident on a photo-detector 28 at certain rotational angular positions of the light deflection unit 16. The intensity of the split-off part beam 24 can be measured with the aid of the photo-detector 28. The intensity of the part beam 24 incident on the photo-detector 28 is dependent on the transmission of the front screen 20; i.e. the photo-detector measures a reduced intensity of the front beam 24 on a reduced transmission of the front screen 20. Since the transmission of the front screen 20 is impaired by a contamination of the front screen 2, an increased degree of contamination of the front screen 20 can be concluded on a reduced intensity of the part beam 24.

To achieve a local resolution which is as high as possible on the measurement of the transmission of the front plane 20, i.e. to monitor the front screen transmission in a manner covering as much of the total area as possible, a plurality of photo-detectors 28 are arranged along the periphery of the front screen 20. It applies here that the local resolution of the transmission measurement is the more precise; the lower the distance between two adjacent photo-detectors 28 is, i.e. the more photo-detectors 28 are used.

So that the photo-detectors 28 do not obstruct the beam path of the light beam 12 emerging from the laser scanning apparatus, they are arranged beneath the front screen 20. They can, however, be arranged equally well above the front screen 20.

Each photo-detector 28 is connected via a lead 30 to the evaluation unit 14. A signal corresponding to the measured intensity of the part beam 24 is transmitted to the evaluation unit 14 via this line 30 in order to be further processed in it. The evaluation unit 14 triggers a corresponding warning signal as soon as the contamination of the front screen 20 at least regionally exceeds a predetermined threshold value.

A second embodiment of the laser scanning apparatus is shown in FIG. 3 which differs from the first embodiment shown in FIG. 1 in that a reference target measurement is additionally provided. The reference target measurement in particular serves for a check of the function of the transceiver unit 10, i.e. of the pulsed laser and of the photo-detector of the transceiver unit 10.

For the reference target measurement, a reference beam 32 is split off the light beam 12 transmitted by the pulsed laser of the transceiver unit 10. For this purpose, the light deflection unit 16 is formed as a planar mirror semi-transmissible for the laser light; i.e. a small intensity portion or beam cross-sectional portion of the light beam 12 transmitted by the pulsed laser of the transceiver unit 10 is transmitted by the deflection unit 16 as a reference beam 32 and is not deflected in the direction of the front screen 20.

The split-off reference beam 32 is instead preferably deflected obliquely to the rotational axis 18 onto a reference target 34 which is arranged beneath the deflection unit 16 and spaced apart from the rotational axis 18 and is deflected by said reference target. The reflected reference beams 36 pass through the deflection unit 16 again from below and are incident on the transceiver unit 10 in which they are detected by the photo-detector of the transceiver unit 10. As soon as no reflected reference beam 36 is unexpectedly detected by the photo-detector of the transceiver unit 10, this means that the pulsed laser and/or the photo-detector of the transceiver 10 is/are defective or that the light path of the reflected reference beam 36 is otherwise disturbed, for example by a defect of the light deflection unit 16.

On a rotation of the deflection unit 16, the split-off reference beam 32 describes a circular orbit in a plane perpendicular to the rotational axis. If the reference target 34 has a circular or ring-shaped form in which the circular orbit of the reference beam 32 extends, a quasi continuous reference target measurement is possible, since a reference light pulse 32 is split off from each light pulse 12 and is, in the normal case, reflected back from the reference target 34 to the photo-detector of the transceiver unit 10.

To reduce data volumes to be evaluated in the evaluation unit 14, it is, however, also possible to restrict the reference target measurement to a predetermined rotational angular range of the deflection unit 16. In a reference target measurement which is restricted to a small angular range, a reference target with a small area is also sufficient. The selected angular range can be defined by an operative switching arrangement 37 which only frees the split-off reference beam 32 for specific angular positions of the light deflection unit 16 in the direction of the reference target 34. The reference beam 32 split off by the deflection unit 16 can, for example, be deflected by an optical arrangement rotating along with the deflection unit 16 such that the reference target 34 is only impacted at certain angular positions. Alternatively to this, shutters synchronized with the light deflection unit 16 can also be used which are realized, for example, via polarization filters or via grid/diaphragm structures which are rotatable with respect to one another.

The third embodiment of the laser scanning apparatus in accordance with the invention shown in FIG. 4 corresponds to the first embodiment shown in FIG. 1, with the part beam 24 split off from the transmitted light beam 12 being used not only for the measurement of the front screen transmission, but simultaneously also for the reference target measurement.

For this purpose, the part beam 24 split off from the light beam 12 and transmitted through the front screen 20 is not incident on a photo-detector 28, as it is shown in FIG. 1, but on a reflector element 38 which is arranged on the outer side 42 of the front screen 20 remote from the light deflection unit 16, i.e. outside the laser scanning apparatus. Moreover, the reflector element 38, as is shown in FIG. 4, is arranged beneath the front screen 20 in order not to obstruct the propagation of the transmitted light beam 2 into the space to be monitored. The reflector element 38 can be just as easily arranged above the front screen 20.

The part beam 24 split off from the light beam 12 is reflected by the reflector element 38 and enters the front screen 20 again as a reflected part beam 40. The reflected part beam 40—transmitted by the front screen 20 and deflected by the optical element 22—extends parallel to the horizontal section of the transmitted light beam 12 until it is incident on the light deflection unit 16 from which it is deflected in the direction of the transceiver unit 10. The reflected part beam 40 is detected and analyzed by the photo-detector of the transceiver unit 10, with it being determined, on the one hand, whether a reflected part beam 40 is incident on the detector at all (reference target measurement) and, on the other hand, the intensity of the reflected part beam 40 is determined (measurement of the front screen transmission).

Due to the one-time splitting off of a part beam 24 from the transmitted light beam 12, two additional measurements can consequently be carried out simultaneously in addition to the distance measurement, namely the checking of the function of the transceiver unit 10, on the one hand, and the measurement of the front screen transmission, on the other hand.

Since the split-off part beam 24 is transmitted through the front screen 20 twice, once as a part beam 24 and the second time as a reflected part beam 40, the part beam 24, 40 is weakened twice by contamination possibly deposited on the front screen 20; i.e. its intensity is reduced twice as much as if it were to pass through the front screen 20 only a single time. The sensitivity of the measurement of the front screen transmission is thereby substantially increased; i.e. such contamination of the front screen 20 can also be detected which would just not be recognized on a one-time passage of the part beam 24 through the front screen 20.

The reflecting element 38 is preferably made in a retro-reflecting manner; i.e. the split-off part beam 24 is largely reflected back in the direction of the lighted light source as a reflected part beam 40, with this taking place almost independently of the angle at which the split-off part beam 24 is incident on the reflector element 38. The reflector element 38 can be formed, for example, by a retro-reflecting foil.

To allow a monitoring of the transmission of the front screen 20 over an area as large as possible, the reflecting element 38 can extend continuously along the outer side 42 of the front screen 20 remote from the deflection unit 16. The reflecting element 38 can, however, also extend along the outer side 42 of the front screen 20 in sections spaced apart from one another.

In a variation (not shown) of the embodiment shown, the front screen 20 cal also be made angled such that the split-off part beam 24 passes through the front screen 20 twice or more before it is incident on the photo-detector 28 or on the reflector element 38. In this case, the photo-detector 28 or the reflector element 38 and the light deflection unit 16 can be disposed on the same side of the front screen 20, i.e. at the interior of the laser scanning apparatus, such that the photo-detector 28 or the reflector element 38 are also protected against external influences and in particular against contamination. To optimize the second or every subsequent entry of the part beam 24 into the front screen 20, the front screen can be provided at least regionally with a reflection reducing surface.

The invention claimed is:

1. A laser scanning apparatus for scanning a monitored zone outside the scanning apparatus with a pulsed light beam comprising
   a transmission unit, which has a pulsed laser for transmitting a light beam into the zone;
   a light deflection unit to deflect the light beam transmitted by the pulsed laser into the zone to be monitored;
   a reception unit for the reception of light pulses which are reflected by an object located in the zone to be monitored;

a front screen which transmits the light beam and which separates the transmission unit, the reception unit and the light deflection unit from the outside of the laser scanning apparatus; and at least one optical element which splits off a part beam from the transmitted light beam and deflects the part beam to a photo-detector for a measurement of the transmission of the front screen.

2. A laser scanning apparatus in accordance with claim 1, characterized in that the optical element is coupled to the front screen.

3. A laser scanning apparatus in accordance with claim 2, characterized in that the optical element is a separate component which can be fastened to the front screen.

4. A laser scanning apparatus in accordance with claim 3 wherein the optical element is fastened to an inner side of the front screen.

5. A laser scanning apparatus in accordance with claim 2, characterized in that the optical element is integrated into the front screen.

6. A laser scanning apparatus in accordance with claim 2, characterized in that the optical element is a diffractive optical element.

7. A laser scanning apparatus in accordance with claim 2, characterized in that the optical element is an optical grid.

8. A laser scanning apparatus in accordance with claim 1, characterized in that the at least one photo-detector for the measurement of the intensity of the received part beam is disposed on the side of the front screen remote from the light deflection unit.

9. A laser scanning apparatus in accordance with claim 8, characterized in that the photo-detector is disposed above or beneath the front screen.

10. A laser scanning apparatus in accordance with claim 1, characterized in that the at least one photo-detector for the measurement of the intensity of the received part beam and the light deflection unit are disposed on the same side of the front screen, with the front screen being formed such that the part beam passes through the front screen at least twice.

11. A laser scanning apparatus in accordance with claim 1, characterized in that at least one reflector element is disposed on the side of the front screen remote from the light deflection unit.

12. A laser scanning apparatus in accordance with claim 11, characterized in that at least a part of the part beam can be reflected by the reflector element via the optical element and via the light deflection unit into the reception unit.

13. A laser scanning apparatus in accordance with claim 11, characterized in that the reflector element is formed as a reference target.

14. A laser scanning apparatus in accordance with claim 11, characterized in that the reflector element is disposed above or beneath the front screen.

15. A laser scanning apparatus in accordance with claim 11, characterized in that the reflector element is formed by a retro-reflecting foil.

16. A laser scanning apparatus in accordance with claim 1, characterized in that at least one reflector element and the light deflection unit are disposed on the same side of the front screen, with the front screen being designed such that the part beam passes through the front screen at least twice.

17. A laser scanning apparatus in accordance with claim 16, characterized in that at least a part of the part beam can be reflected by the reflector element via the optical element and via the light deflection unit into the reception unit.

18. A laser scanning apparatus in accordance with claim 16, characterized in that the reflector element is formed as a reference target.

19. A laser scanning apparatus in accordance with claim 16, characterized in that the reflector element is disposed above or beneath the front screen.

20. A laser scanning apparatus in accordance with claim 16, characterized in that the reflector element is formed by a retro-reflecting foil.

21. A laser scanning apparatus in accordance with claim 1, characterized in that the light deflection unit is made such that a reference beam can be split off from the transmitted light beam and can be deflected in the direction of a reference target.

22. A laser scanning apparatus in accordance with claim 21, characterized in that the reference beam can be transmitted through the light deflection unit.

23. A laser scanning apparatus in accordance with claim 22, characterized in that the reference target is made in a reflecting manner and the light deflection unit is made in a light transmitting manner such that the reference beam can be coupled via the light deflection unit into the reception unit after reflection at the reference target.

24. A laser scanning apparatus in accordance with claim 22, characterized in that the reference target is formed by a retro-reflecting foil.

25. A laser scanning apparatus in accordance with claim 22, characterized in that the reference beam can be controlled by an operative switching arrangement such that it is only incident on the reference target at predetermined angular positions of the light deflection unit.

26. A laser scanning apparatus in accordance with claim 25, characterized in that the operative switching arrangement is an optical arrangement rotating with the light deflection unit.

27. A laser scanning apparatus in accordance with claim 25, characterized in that the operative switching arrangement is a fixed diaphragm and/or shutter arrangement.

28. A laser scanning apparatus in accordance with claim 27, characterized in that the shutter arrangement is formed by polarization filters or by grid/diaphragm structures rotatable with respect to one another.

29. A laser scanning apparatus in accordance with claim 27 wherein the switching arrangement is synchronized with the light deflection unit.

30. A laser scanning apparatus in accordance with claim 21, characterized in that the reference target is made in a reflecting manner and the light deflection unit is made in a light transmitting manner such that the reference beam can be coupled via the light deflection unit into the reception unit after reflection at the reference target.

31. A laser scanning apparatus in accordance with claim 21, characterized in that the reference target is formed by a retro-reflecting foil.

32. A laser scanning apparatus in accordance with claim 21, characterized in that the reference beam can be controlled by an operative switching arrangement such that it is only incident on the reference target at predetermined angular positions of the light deflection unit.

33. A laser scanning apparatus in accordance with claim 32, characterized in that the operative switching arrangement is an optical arrangement rotating with the light deflection unit.

34. A laser scanning apparatus in accordance with claim 32, characterized in that the operative switching arrangement is a fixed diaphragm and/or shutter arrangement.

35. A laser scanning apparatus in accordance with claim 34, characterized in that the shutter arrangement is formed by polarization filters or by grid/diaphragm structures rotatable with respect to one another.

36. A laser scanning apparatus in accordance with claim 34 wherein the switching arrangement is synchronized with the light deflection unit.

37. A laser scanning apparatus in accordance with claim 1, characterized in that the light deflection unit includes a planar mirror.

38. A laser scanning apparatus in accordance with claim 37 wherein the planar mirror is a semi-permeable planar mirror.

39. A laser scanning apparatus in accordance with claim 1, characterized in that the light deflection unit is rotatable about an axis, in order to monitor an angular range of 360° with the transmitted light beam.

40. A laser scanning apparatus in accordance with claim 39 wherein the axis is a vertical axis and the monitored angular range lies in a horizontal plane.

41. A method for the monitoring of a front screen of a laser scanning apparatus
comprising splitting off a part beam from a light beam transmitted by a transmission unit with an optical element, deflecting the part beam through the front screen to determine the transmission of the front screen, and reflecting at least a part of the part beam transmitted through the front screen back through the front screen and the optical element by means of a reflector element onto a reception unit in which the intensity of the reflected part beam is measured.

42. A method in accordance with claim 41, characterized in that the intensity of the part beam transmitted through the front screen is measured by means of at least one photodetector.

43. A method according to claim 41 wherein the optical element is coupled to the front screen.

44. A method according to claim 41 wherein the light beam is a pulsed laser light beam.

45. A method for monitoring a front screen of a laser scanning apparatus comprising splitting off a part beam from a light beam transmitted by a transmission unit with an optical element, deflecting the part beam through the front screen to determine the transmission of the front screen, and splitting off a reference beam from the transmitted light beam by a light deflection unit and deflecting the reference beam to a reference target which reflects the reference beam at least partly, with the light deflection unit deflecting the reflected reference beam in the direction of a reception unit in which the intensity of the reflected reference beam is determined.

* * * * *